(12) United States Patent
Sulzer

(10) Patent No.: US 10,247,593 B2
(45) Date of Patent: Apr. 2, 2019

(54) HOUSING FOR A MAGNETO INDUCTIVE FLOW MEASURING DEVICE

(71) Applicant: Endress + Hauser Flowtec AG, Reinach (CH)

(72) Inventor: Thomas Sulzer, Basel (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 60 days.

(21) Appl. No.: 15/301,511

(22) PCT Filed: Mar. 24, 2015

(86) PCT No.: PCT/EP2015/056190
§ 371 (c)(1),
(2) Date: Oct. 3, 2016

(87) PCT Pub. No.: WO2015/158503
PCT Pub. Date: Oct. 22, 2015

(65) Prior Publication Data
US 2017/0108363 A1    Apr. 20, 2017

(30) Foreign Application Priority Data

Apr. 17, 2014    (DE) .................. 10 2014 105 569

(51) Int. Cl.
*G01F 15/14*    (2006.01)
*G01F 1/58*    (2006.01)

(52) U.S. Cl.
CPC ............. *G01F 15/14* (2013.01); *G01F 1/588* (2013.01)

(58) Field of Classification Search
CPC ...................................................... G01F 15/14
(Continued)

(56) References Cited

U.S. PATENT DOCUMENTS 3,470,046 A * 9/1969 Verdin ................ B29C 63/0069
138/143
4,722,231 A    2/1988 Tanaka et al.
(Continued)

FOREIGN PATENT DOCUMENTS

CN      1 973187 A    5/2007
CN   10 2105766 A    6/2011
(Continued)

OTHER PUBLICATIONS

German Search Report, German Patent Office, Munich, DE, dated Jan. 13, 2015.
(Continued)

*Primary Examiner* — Jewel V Dowtin
(74) *Attorney, Agent, or Firm* — Bacon & Thomas, PLLC

(57) ABSTRACT

Apparatus for measuring the flow of a fluid through a measuring tube using the magneto inductive measuring principle, comprising a magnet system for producing a constant magnetic field perpendicular to the flow direction of the fluid, at least two measuring electrodes coupling with the fluid and secured on a measuring tube subsection for sensing an induced voltage, at least one electronics unit for signal registration, evaluation and/or power supply, and a housing, wherein the housing bounds and protects against the environment the measuring tube subsection and at least one other component secured outwardly thereto on the side facing away from the fluid, wherein the housing is manufactured at least partially of a thermoplastic material, which encases with accurate fit the measuring tube subsection and the at least one other component secured thereto.

8 Claims, 2 Drawing Sheets

(58) Field of Classification Search
USPC .................................................. 73/861.12
See application file for complete search history.

(56) References Cited

U.S. PATENT DOCUMENTS

| | | | | |
|---|---|---|---|---|
| 5,247,837 | A * | 9/1993 | Corpron | G01F 1/584 73/861.11 |
| 5,469,746 | A * | 11/1995 | Fukunaga | G01F 1/60 73/861.12 |
| 6,611,770 | B1 * | 8/2003 | O'Donnell | G01D 3/032 702/45 |
| 7,938,020 | B2 * | 5/2011 | Diederichs | G01F 1/584 73/861.12 |
| 9,410,831 | B2 * | 8/2016 | Smith | G01F 1/584 |
| 2008/0035227 | A1 | 2/2008 | Woods et al. | |
| 2010/0024568 | A1 | 2/2010 | Diederichs | |

FOREIGN PATENT DOCUMENTS

| | | |
|---|---|---|
| DE | 3616227 A1 | 11/1986 |
| DE | 4007225 A1 | 9/1991 |
| DE | 102005009675 B3 | 12/2006 |
| DE | 102006023915 A1 | 11/2007 |
| DE | 102007029563 A1 | 1/2009 |
| DE | 102012110665 A1 | 5/2014 |
| DE | 102014105569 B3 | 8/2015 |
| JP | 2002043010 A | 2/2002 |
| WO | 9936749 A1 | 7/1999 |

OTHER PUBLICATIONS

International Search Report, EPO, The Netherlands, dated Sep. 22, 2015.
English Translation of the International Preliminary Report on Patentability, WIPO, Geneva, CH, dated Oct. 27, 2016.

* cited by examiner

HOUSING FOR A MAGNETO INDUCTIVE FLOW MEASURING DEVICE

TECHNICAL FIELD

The invention relates to an apparatus for measuring flow of a fluid through a measuring tube using the magneto inductive measuring principle.

BACKGROUND DISCUSSION

Magneto inductive flow measuring devices are widely used in process and automation technology for fluids having an electrical conductivity of, for instance, 5 μS/cm. Corresponding flow measuring devices are sold, for example, by Endress+Hauser in the most varied of forms of embodiment for different fields of application under the mark, PROMAG.

This measuring principle rests on Faraday's law of magnetic induction and is described in various publications. By means of a magnet system secured on a measuring tube subsection, a magnetic field of constant strength is produced perpendicular to the flow direction of the conductive fluid. As a result, ions present in the flowing fluid are deflected in opposite directions. The electrical voltage occurring from this separation of charges is sensed by means of at least two measuring electrodes secured at or in the measuring tube subsection. The sensed voltage is proportional to the flow velocity of the fluid and therewith proportional to volume flow.

Correspondingly, a magneto inductive flow measuring device applied in connection with the solution of the invention includes at least the following components: a measuring tube, a magnet system and at least two measuring electrodes. Furthermore, at least one electronics unit is required for signal registration, evaluation and/or power supply, and, in support, likewise a housing, which bounds and protects against the environment the measuring tube subsection with the measuring electrodes as well as at least one additional component of the apparatus, which is secured on the side of the measuring tube facing away from the fluid. This additional component can include besides the magnet system also any cable for signal conduction and located in the direct vicinity of the measuring tube.

If the electronics unit is located in the direct vicinity of the measuring tube subsection—one then speaks of a compact construction—the electronics unit can be accommodated in the same housing as the measuring tube subsection with the measuring electrodes and the magnet system. Otherwise, a separate housing is used. The invention relates to both configurations.

The housing for a flow measuring device should ideally be cost effectively and simply manufacturable. Furthermore, it is advantageous, when sensitive contact locations and cable connections can be fixed in position within the housing, since these can otherwise easily break in the face of repeated vibrations. Known for fulfillment of these requirements is a solution wherein the housing is manufactured by a direct embedding in potting compound. An example of this is described in the European publication, EP1522828A1.

However, a direct embedding of all device components in potting compound also presents many method related, potential problems. On the one hand, most potting methods involve high pressures and/or temperatures. These place high requirements on the respective device component. Due to high temperatures, for example, plastic parts can melt and soldered locations can oxidize. High pressures can, in turn, have the result that individual components are torn from their intended positions. Moreover, the composition of the potting compound must be so selected that sufficient wetting of the respective device components is assured.

In the context of a magneto inductive flow measuring device, of concern is, for example, the contacting of the measuring electrodes as well as cables serving for signal conduction and/or supply and usually integrated into the housing or connecting the measuring electrodes and the magnet system with the electronics unit. Another affected component is the magnet system, which usually is likewise composed of a number of components, including at least two field coils and at least two pole shoes.

A further disadvantage of the direct embedding in potting compound is that potted device components are subsequently only accessible with difficulty, since the potting compound surrounds all device components and occupies all accessible spaces in between them. In the context of a magneto inductive flow measuring device, this relates again especially to the measuring electrodes, the magnet system, as well as any additional components, such as the already mentioned cable, secured in the direct vicinity of the measuring tube subsection.

This can especially be disadvantageous in the case of failure of one of the potted components of the flow measuring device. Often, it then makes more sense to replace the entire flow measuring device than to perform a repair.

SUMMARY OF THE INVENTION

An object of the present invention is, thus, to provide, as housing for a magneto inductive flow measuring device, an equally attractive alternative to direct embedding in potting compound, which alternative permits accessing components of the flow measuring device located in the housing.

This object is achieved by an apparatus for measuring the flow of a fluid through a measuring tube using the magneto inductive measuring principle, which apparatus comprises components as follows:
- a magnet system for producing a constant magnetic field directed perpendicularly to the flow direction of the fluid;
- at least two measuring electrodes coupling with the fluid and secured on a measuring tube subsection for sensing an induced voltage;
- at least one electronics unit for signal registration, evaluation and/or power supply;
- and a housing, which bounds and protects against the environment the measuring tube subsection and at least one other component secured outwardly thereto on the side facing away from the fluid, wherein the housing is manufactured at least partially of a thermoplastic material, which encases with accurate fit the measuring tube subsection and the at least one other component secured thereto.

The object is further achieved by a method for manufacturing such an apparatus.

According to the invention, the housing thus encases, for example, the measuring tube subsection, the measuring electrodes, the magnet system, as well as other components necessary for signal registration, conduction, or power supply.

Since the components of the flow measuring device in the direct vicinity of the measuring tube are encased with accurate fit by the housing, also a sufficient cable securement is assured. Moreover, the present solution is cost effective and simple to build. A matching to different dimensions of various flow measuring devices is possible in simple manner.

In contrast to direct embedding in potting compound, a housing of the invention has the advantage that, as a rule, no material can penetrate between the at least one other component of the flow measuring device and the measuring tube subsection. The thermoplastic material only encases the components of the flow measuring device with accurate fit. This, in turn, permits, in the case of occurrence of a defect, simple access to the encased components, since the thermoplastic material can be simply removed.

Advantageously, the apparatus is so embodied that the housing is shrunk onto the measuring tube subsection and the at least one other component of the apparatus. This simple manner of application means that the housing follows the contours of the measuring tube subsection and the at least one additional component and thus encases these with a fit, which is as accurate as possible.

In an advantageous embodiment of the apparatus, the housing includes at least one feedthrough with a connection for at least one connection cable or other electronic components of the apparatus for connecting components located in the housing with additional components outside of the housing.

The feedthrough is, in such case, advantageously so embodied that it protects the connection cable or the other electronic component from damage. Thus, for example, cable break in the region of the connection can be prevented.

In an especially preferred embodiment, the housing is composed of a shrink tube. Shrink tubes are thermoplastic tubes, which strongly contract upon minimal heating (for instance, 50° C.) to form an exactly fitting, isolating, insulating and/or protective coating.

Shrink tubes are sold in different forms by, for example, the firm Deifuss-Kable (http://www.deifuss-kable.de), are made, for example, of polyolefins, polyvinylidene fluoride, polyvinyl chloride and even Teflon, and are obtainable in diameters of, for instance, 1 mm up to 1.1 m and with shrink ratios of 2:1 to 10:1. There are shrink tubes with the most varied of wall thicknesses, from thin to thick walls, usually, for instance, between 1-65 mm. Thick walled shrink tubes are used especially in the case of insulating and protecting earth buried cables. Of course, they can also be applied in other fields.

Also, in the case of a shrink tube as housing, it is advantageous when the shrink tube is thick-walled, since the strength and stability of a measuring tube encasement depends decisively on the wall thickness of the encasement.

It is, furthermore, advantageous that the thermoplastic housing be manufactured of one piece. This can occur, for example, by a special preconfiguration. In this way, the housing can be applied especially simply onto the components to be encased.

In a preferred embodiment, the housing has a T-shape. In this way, the housing already has a feedthrough for a connection cable or another additional electronic component. Of course, also other forms are possible. Especially, a form can have more than one feedthrough.

Shrink tubes, for example, in the shape of a T, can be ordered from the firm, Hellermann Tyton (www.HellermannTyton.de). If one would like to use such a component as a thermoplastic housing for a flow measuring device, of course, the dimensions as well as the wall thickness of the shrink tube must be properly matched.

In an especially preferred embodiment, the thermoplastic material is provided internally with an adhesive layer. In this way, adhesion between the housing material and the respective components of the flow measuring device is improved. The firm, Deifuss-Kable, sells, for example, shrink tube parts coated internally with hot melt adhesive, whose adhesive properties become active during the shrinking.

The manufacture of a housing for a magneto inductive flow measuring device according to at least one of the above mentioned forms of embodiment occurs preferably by means of a method, in the case of which the thermoplastic material is first matched and correspondingly preconfigured in its dimensions to those of the measuring tube subsection and the at least one additional component of the flow measuring device, the preconfigured thermoplastic material is then pushed over the measuring tube subsection and the at least one other component, and, following that, shrunk on with accurate fit.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
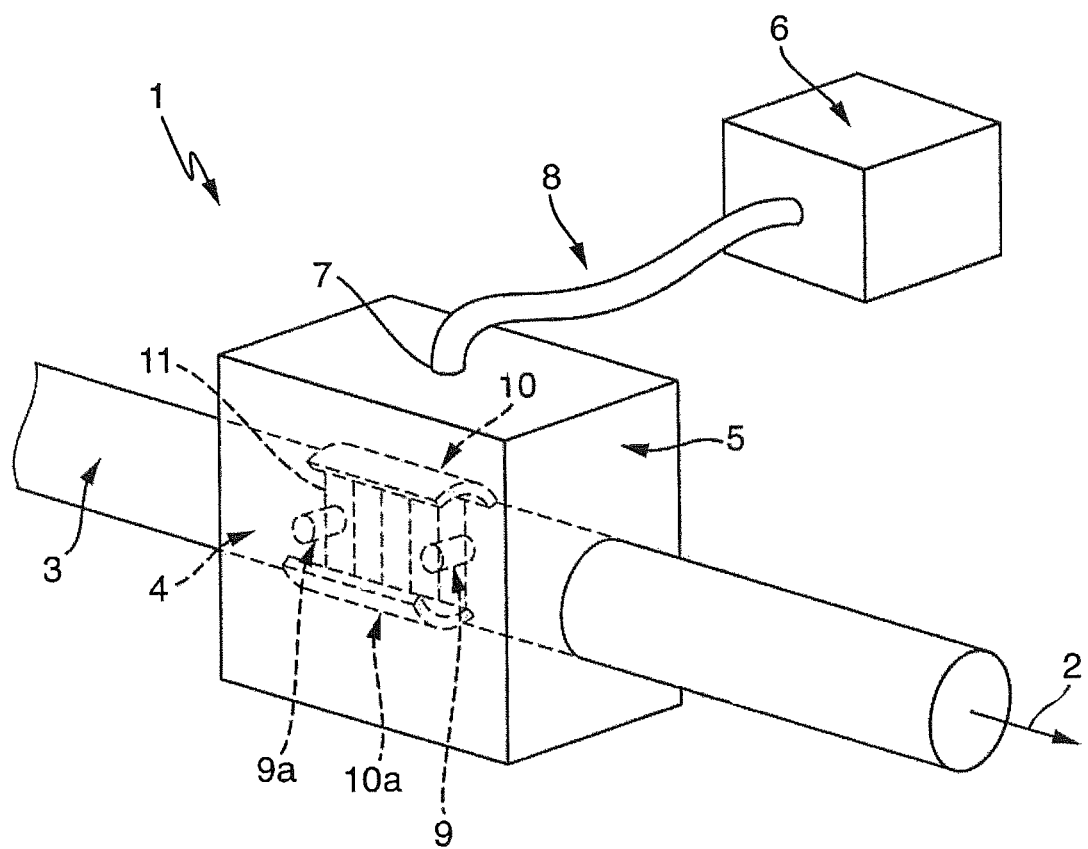
FIG. 1 is a schematic illustration of a magneto inductive measuring device.

FIG. 1 shows a magneto inductive flow measuring device 1 for measuring the flow of a fluid 2 through a measuring tube 3. Secured on a measuring tube subsection 4 are various components of the flow measuring device 1. All of these components as well as the measuring tube subsection 4 are surrounded by a housing 5. Located outside of the housing 5 is the electronics unit 6 for signal registration, evaluation and/or power supply. Electronics unit 6 is connected electrically via a connection cable 8 with a connection 7 at the housing 5. Located within the housing 5 are the measuring electrodes 9,9a for sensing the voltage and the magnet system, which here, by way of example, is shown to be based on two field coils 10, 10a. Each of the measuring electrodes 9, 9a extends perpendicularly to the field coils 10, 10a. For simplifying the drawing, no connecting cables or other signal processing units are shown within the housing 5. It is understood, however, that such components are likewise necessary.

Figure 2:
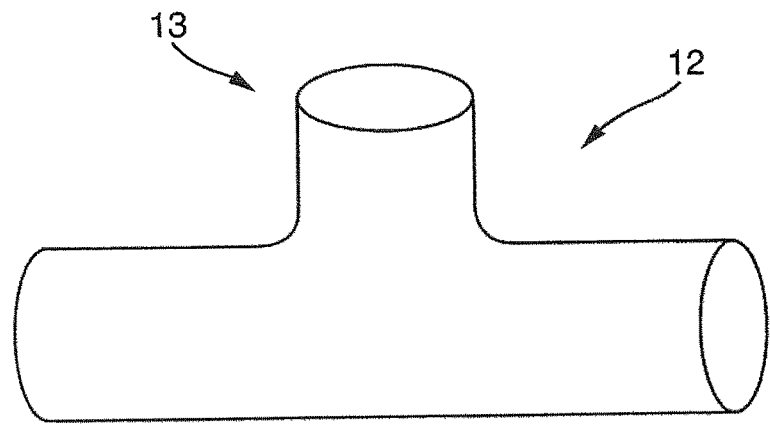
FIG. 2 is a thermoplastic shrink tube having a T-shape.

FIG. 2 shows thermoplastic material 12 in the form of a T for application according to the invention as housing 5 for the flow measuring device 1. Provision in the form of a T means that a feedthrough 13 for a connection 7 is present from the beginning.

Figure 3:
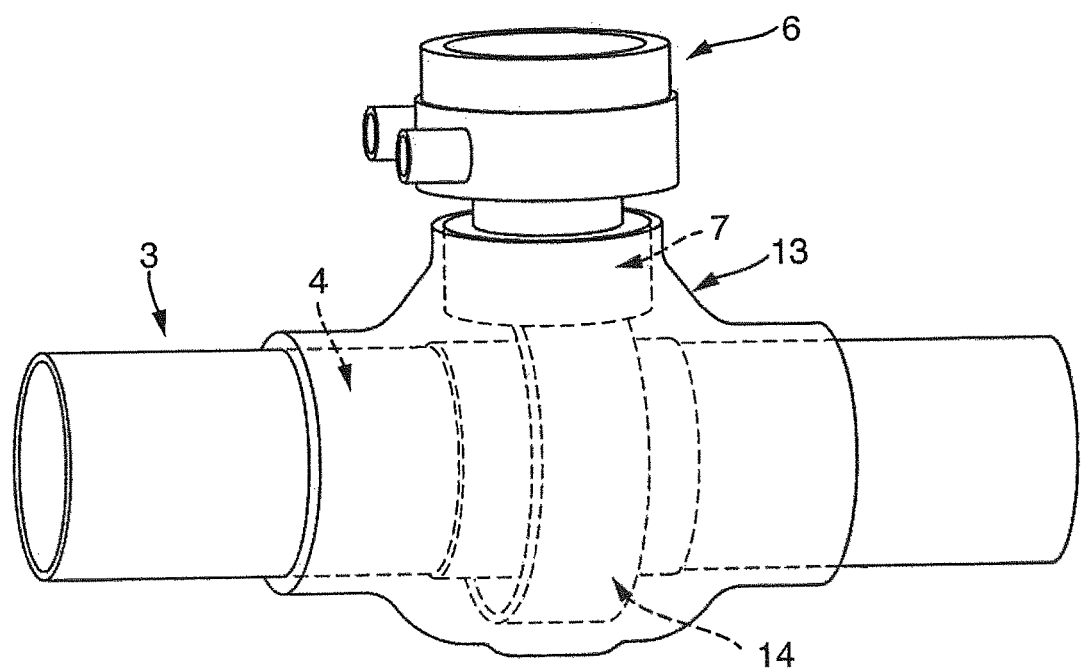
FIG. 3 is a magneto inductive flow measuring device of the invention having a housing of thermoplastic material.

FIG. 3 shows an embodiment of an magneto inductive flow measuring device 1 of the invention including measuring tube 3, measuring tube subsection 4, magnet system 14 with at least the two field coils 10, 10a of FIG. 1, connection 7, and electronics unit 6 mounted directly on the connection 7, so that the flow measuring device 1 here has the above mentioned, compact construction. Measuring tube subsection 4 with the measuring electrodes (not shown in FIG. 3), the magnet system 14 and the connection 7 are encased by a thermoplastic housing 5 touching with accurate fit on their predetermined contours. Housing 5 can be, for example, a shrink tube, which is preconfigured as sketched in FIG. 2 and then shrunk onto the components of the flow measuring device 1 in the direct vicinity of the measuring tube 3.

The invention claimed is:

1. An apparatus for measuring flow of a fluid through a measuring tube using the magneto inductive measuring principle, comprising components as follows:
    a magnet system for producing a constant magnetic field perpendicular to the flow direction of the fluid;
    at least two measuring electrodes coupling with the fluid and secured on a measuring tube subsection for sensing an induced voltage;
    at least one electronics unit for signal registration, evaluation and/or power supply; and
    a housing, wherein:
    said housing bounds and protects against the environment said measuring tube subsection and at least one other component secured outwardly thereto on the side facing away from the fluid;
    said housing is manufactured at least partially of a thermoplastic material, which encases with accurate fit said measuring tube subsection and the at least one other component secured thereto; and
    said thermoplastic material is shrunk onto said measuring tube subsection and the at least one other component of the apparatus.

2. The apparatus as claimed in claim 1, wherein:
    said housing has at least one feedthrough with a connection for at least one connection cable or other electronic components for connecting components located in said housing with additional components outside of said housing; and
    that the feedthrough is so embodied that it protects said connection cable to be fed through or the other electronic component from damage.

3. The apparatus as claimed in claim 1, wherein:
    said thermoplastic material is composed of a thick-walled shrink tube.

4. The apparatus as claimed in claim 1, wherein:
    said housing is manufactured of one piece.

5. The apparatus as claimed in claim 1, wherein:
    said housing has a T shape.

6. The apparatus as claimed in claim 1, wherein:
    said thermoplastic material is provided internally with an adhesive layer.

7. A method for manufacturing an apparatus for measuring flow of a fluid through a measuring tube using the magneto inductive measuring principle, comprising the steps as follows:
    producing a constant magnetic field perpendicular to the flow direction of the fluid using a magnet system;
    providing at least two measuring electrodes coupling with the fluid and secured on a measuring tube subsection for sensing an induced voltage;
    providing at least one electronics unit for signal registration, evaluation and/or power supply; and
    providing a housing, wherein:
    the housing bounds and protects against the environment the measuring tube subsection and at least one other component secured outwardly thereto on the side facing away from the fluid;
    the housing is manufactured at least partially of a thermoplastic material;
    the measuring tube subsection and the at least one other component secured thereto are encased with the thermoplastic material with an accurate fit; and
    said thermoplastic material is shrunk onto said measuring tube subsection and the at least one other component of the apparatus.

8. The method as claimed in claim 7, wherein:
    the thermoplastic material is preconfigured matched in its dimensions to those of the measuring tube subsection and the at least one additional component; and
    the preconfigured thermoplastic material is then pushed over the measuring tube subsection and the at least one other component, and, following that, shrunk thereon with an accurate fit.

* * * * *